(12) United States Patent
Nagura et al.

(10) Patent No.: US 9,205,767 B2
(45) Date of Patent: Dec. 8, 2015

(54) VEHICLE SEAT RECLINING DEVICE

(71) Applicant: AISIN SEIKI KABUSHIKI KAISHA, Kariya-shi (JP)

(72) Inventors: Mikihito Nagura, Okazaki (JP); Naoaki Hoshihara, Obu (JP); Shinya Isobe, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/350,654

(22) PCT Filed: Jan. 22, 2013

(86) PCT No.: PCT/JP2013/051140
§ 371 (c)(1),
(2) Date: Apr. 9, 2014

(87) PCT Pub. No.: WO2013/111723
PCT Pub. Date: Aug. 1, 2013

(65) Prior Publication Data
US 2014/0225409 A1 Aug. 14, 2014

(30) Foreign Application Priority Data
Jan. 26, 2012 (JP) ................. 2012-014393

(51) Int. Cl.
*B60N 2/235* (2006.01)
*B60N 2/22* (2006.01)

(52) U.S. Cl.
CPC ............ *B60N 2/2356* (2013.01); *B60N 2/2213* (2013.01)

(58) Field of Classification Search
CPC ........................... B60N 2/2356; B60N 2/2213
USPC .......................................... 297/367 R, 367 P
See application file for complete search history.

(56) References Cited

U.S. PATENT DOCUMENTS 5,558,402 A * 9/1996 Yamada .................... 297/367 R
8,651,578 B2 2/2014 Yamada et al.
(Continued)

FOREIGN PATENT DOCUMENTS

CN 1496891 A 5/2004
CN 1966306 A 5/2007
(Continued)

OTHER PUBLICATIONS

International Preliminary Report on Patentability and Written Opinion issued on Jul. 29, 2014, in PCT/JP2013/051140 submitting English translation.
(Continued)

*Primary Examiner* — Anthony D Barfield
(74) *Attorney, Agent, or Firm* — Oblon, McClelland, Maier & Neustadt, L.L.P.

(57) ABSTRACT

A vehicle seat reclining device is provided with a first bracket having internal teeth, a plurality of pawls each having external teeth capable of engaging with and disengaging from the internal teeth, a second bracket having a guide portion that movably holds the pawls in a radial direction, and a cam mechanism, which moves each pawl in the radial direction. Among the external teeth in each pawl, at least one external tooth including an end tooth located at one end in the circumferential direction of the pawl is displaced inward in the radial direction with respect to a reference position corresponding to the pitch circle of the internal teeth along a center line that divides the external tooth into two parts in the circumferential direction without changing the shape of an effective engagement portion for the internal tooth and the pitch circle radius of the external tooth.

5 Claims, 7 Drawing Sheets

(56) References Cited

U.S. PATENT DOCUMENTS

2003/0025376 A1* 2/2003 Moriyama et al. ............ 297/367
2007/0108825 A1   5/2007 Yamada et al.

FOREIGN PATENT DOCUMENTS

| JP | 55-111460 U | 8/1980 |
|---|---|---|
| JP | 11-169253 A | 6/1999 |
| JP | 2001-17259 | 1/2001 |
| JP | 2002-10850 | 1/2002 |
| JP | 2002-101993 A | 4/2002 |
| JP | 2002-177083 A | 6/2002 |
| JP | 2002-177084 A | 6/2002 |
| JP | 2003-070583 A | 3/2003 |
| JP | 2004-105637 A | 4/2004 |
| JP | 2007-135797 A | 6/2007 |
| JP | 2010-000900 A | 1/2010 |

OTHER PUBLICATIONS

U.S. Appl. No. 14/350,614, filed Apr. 9, 2014, Nagura, et al.
International Search Report issued Feb. 19, 2013 in PCT/JP2013/051140.
Office Action issued Sep. 6, 2015 in Chinese Patent Application No. 201380006182.7 (with English translation).

* cited by examiner

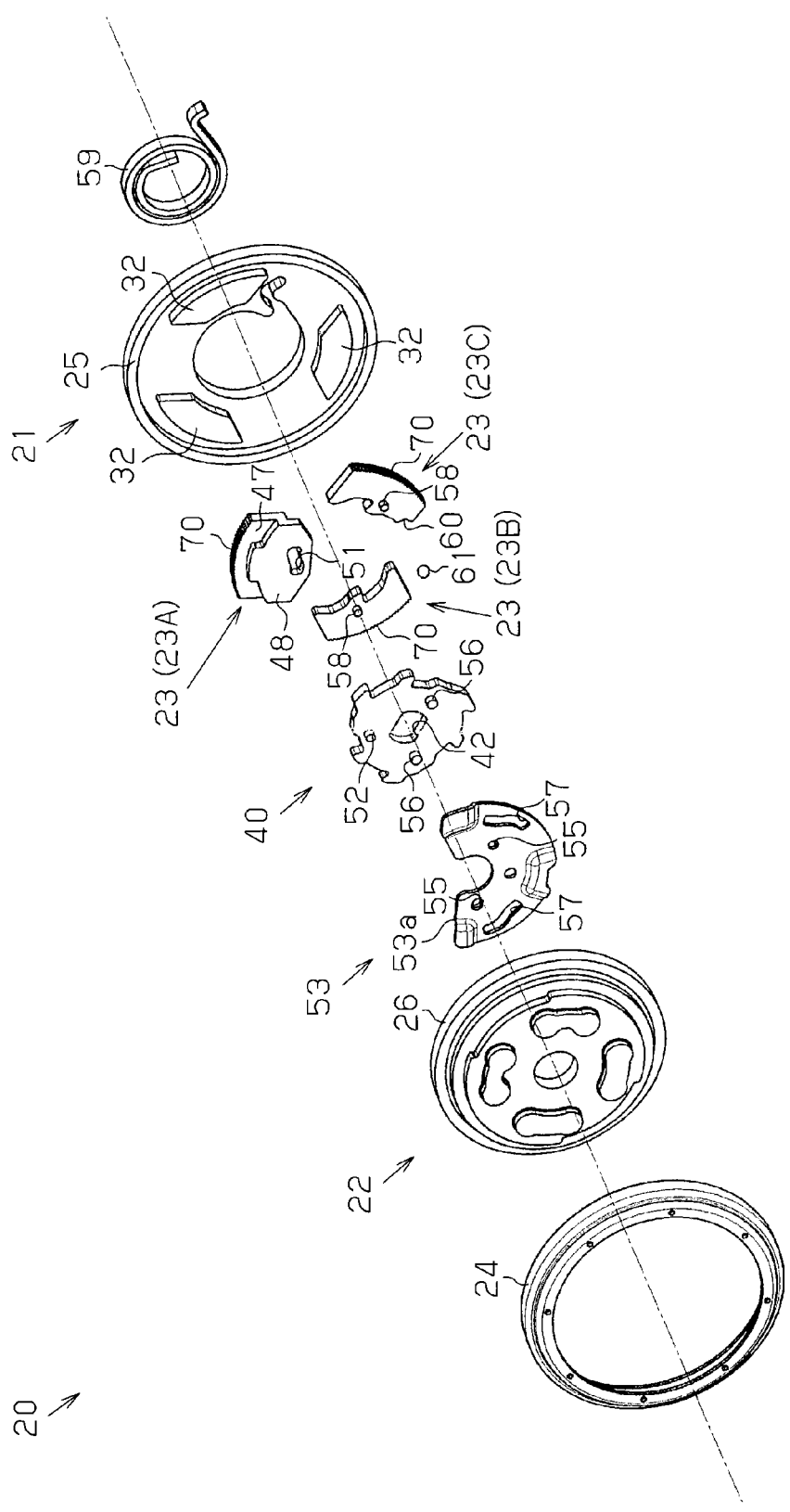

VEHICLE SEAT RECLINING DEVICE

FIELD OF THE INVENTION

The present invention relates to a vehicle seat reclining device.

BACKGROUND OF THE INVENTION

Vehicle seats generally include a reclining device that is capable of adjusting the tilt angle of a seat back relative to a seat cushion.

The reclining device disclosed in Patent Document 1, for example, includes a first bracket (gear plate) having internal teeth on an annular inner circumference, pawls (lock gears) each having external teeth that are engageable with and disengageable from the internal teeth, and a second bracket (base plate) having guide portions that retain the pawls to be movable in a radial direction. The second bracket is rotational relative to the first bracket. The reclining device further includes a cam mechanism, which has a cam body located radially inward of the pawls. The cam mechanism is configured to move the pawls in the radial direction according to rotation of the cam body so that the external teeth of the pawls engage with and disengage from the internal teeth of the first bracket. One of the first bracket and the second bracket is secured to the seat cushion, and the other is secured to the seat back.

When the pawls move radially outward and the external teeth mesh with the internal teeth of the first bracket, relative rotation between the first bracket and the second bracket is restricted (locked state). When the pawls move radially inward and the external teeth disengage from the internal teeth of the first bracket, relative rotation between the first bracket and the second bracket is permitted (unlocked state). The tilt angle of the seat back can be adjusted in this unlocked state.

However, when load is applied to the seat back such as when an occupant leans against the seat back, pressure that pushes the internal teeth of the first bracket and the external teeth of the pawls toward each other is applied. If the locked state is cancelled in this state, unlocking may fail to be smoothly performed such as a case where the locked state is suddenly cancelled or noise is generated, and operational sensation of unlocking may be undesirably degraded.

To address this problem, for example, Patent Document 2 discloses a structure that improves ease of separation of the external teeth from the internal teeth by further adding an inclination angle (draft angle) to a pressure angle of an end tooth located on one circumferential end or on each of both circumferential ends among the external teeth of each pawl.

If, however, a draft angle is added to the pressure angle, the size of the external teeth is reduced. Meshing strength between the internal teeth and the external teeth, that is, locking strength is consequently reduced, and feel of rigidity of the seat back may be undesirably reduced.

Based on that fact, Patent Document 1 discloses a structure in which, in each of the pawls, the pitch circle radius formed by at least one external tooth including the end tooth located on a first circumferential end is set smaller than the pitch circle radius of the internal teeth, and the pitch circle center formed by at least one external tooth including the end tooth is decentered with respect to the pitch circle center of the internal teeth toward the internal teeth and toward the end tooth located on a second circumferential end.

With this configuration, the tooth tip of at least one external tooth including the end tooth located on the first circumferential end tilts toward the first circumferential end. The ease of separation of the external teeth from the internal teeth is thus improved while maintaining the size of the external teeth and ensuring the required meshing strength.

PATENT DOCUMENTS

Patent Document 1: Japanese Laid-Open Patent Publication No. 2007-135797
Patent Document 2: Japanese Laid-Open Patent Publication No. 2002-101993

SUMMARY OF THE INVENTION

Further size reduction of the vehicle seat reclining devices have been underway. To compensate for the decrease in the locking strength associated with size reduction, the number of the external teeth of the pawls that mesh with the internal teeth has been increased, resulting in reduction in the pressure angle between the internal teeth and the external teeth. Due to this, in the above described conventional technique, it has become increasingly difficult to perform smooth unlocking while reliably maintaining the ease of separation of the external teeth from the internal teeth. In this respect, there is still room for improvement.

Accordingly, it is an objective of the present invention to provide a vehicle seat reclining device that allows smooth unlocking while ensuring required locking strength.

To achieve the foregoing objective and in accordance with one aspect of the present invention, a vehicle seat reclining device is provided that includes a first bracket, a plurality of pawls, a second bracket, and a cam mechanism. The first bracket is adapted to be secured to one of a seat cushion and a seat back. The first bracket includes an annular inner circumferential surface and internal teeth provided on the inner circumferential surface. The pawls each include external teeth that are engageable with and disengageable from the internal teeth. The second bracket is adapted to be secured to the other of the seat cushion and the seat back. The second bracket includes a guide portion that holds the pawls such that the pawls are movable in a radial direction, and the second bracket is capable of adjusting a tilt angle of the seat back relative to the seat cushion according to relative rotation of the second bracket with respect to the first bracket. The cam mechanism includes a cam body arranged radially inward of the pawls. The cam mechanism moves the pawls in the radial direction according to rotation of the cam body to engage and disengage the external teeth of the pawls with and from the internal teeth of the first bracket. Among the external teeth of each of the pawls, at least one external tooth including an end tooth located at one circumferential end of the pawl is displaced radially inward with respect to a reference position corresponding to a pitch circle of the internal teeth along a center line that divides the external tooth into two in the circumferential direction without changing the shape of an effective mesh portion with respect to the internal teeth and a pitch circle radius of the external teeth.

With this configuration, a gap is formed between the external teeth that are displaced radially inward and the internal teeth without changing the size of the external teeth. In particular, a relatively large clearance is formed on the side of the external teeth that is displaced radially inward, that is, on the side closer to one circumferential end of each pawl. Thus, in a stage before the external teeth are caught on the internal teeth, the pawls are moved radially inward by a greater amount. In a state where the external teeth mesh with the internal teeth, the direction of mesh reaction force that acts between each external tooth and the associated internal tooth, that is, a common normal line of the tooth surfaces of the external tooth and the internal tooth intersects, at a smaller angle, with a guide portion located circumferentially opposite with respect to a center line that divides each pawl into two in the circumferential direction. This reduces the component of the force that presses each pawl against the associated guide portion. As a result, ease of separation of the external teeth from the internal teeth when moving the pawls radially inward is improved without reducing the meshing strength. Thus, unlocking is smoothly performed while ensuring the required locking strength.

BRIEF DESCRIPTION OF THE DRAWINGS

FIG. 3 is an exploded perspective view illustrating the seat reclining device of FIG. 2(a);

DETAILED DESCRIPTION OF THE PREFERRED EMBODIMENTS

One embodiment of the present invention will now be described with reference to the drawings.

Figure 1:
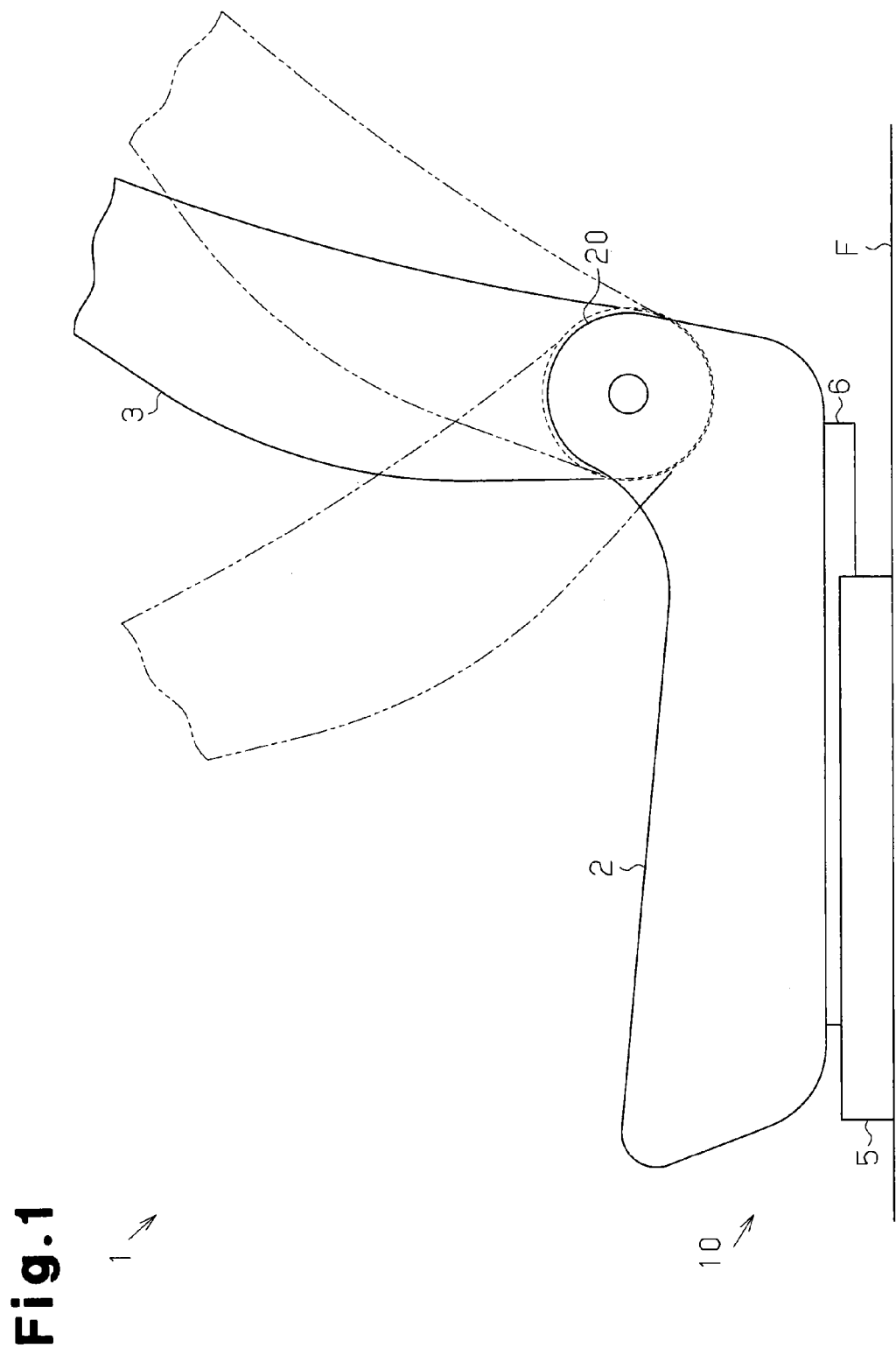
FIG. 1 is a schematic diagram illustrating a vehicle seat to which a seat reclining device according to one embodiment of the present invention is applied.

As shown in FIG. 1, a vehicle seat 1 includes a seat cushion 2 and a seat back 3 that can be tilted and is provided on the rear end of the seat cushion 2.

A pair of lower rails 5 arranged parallel with each other is provided on a vehicle floor F, and a pair of upper rails 6 is mounted on the lower rails 5 to be movable along the lower rails 5. The seat cushion 2 is secured to the upper rails 6.

The lower rails 5 and the upper rails 6 form a seat slide apparatus 10. A vehicle occupant uses the function of the seat slide apparatus 10 to adjust the position of the seat 1 in a vehicle fore-and-aft direction (left-and-right direction in FIG. 1).

A seat reclining device 20, which is capable of restricting and permitting relative rotation of the seat back 3 with respect to the seat cushion 2, is provided between the seat cushion 2 and the seat back 3. The vehicle occupant uses the function of the seat reclining device 20 to adjust the tilt angle of the seat back 3 (refer to the broken lines in which a long dash alternates with a pair of short dashes in FIG. 1).

Figure 2B:
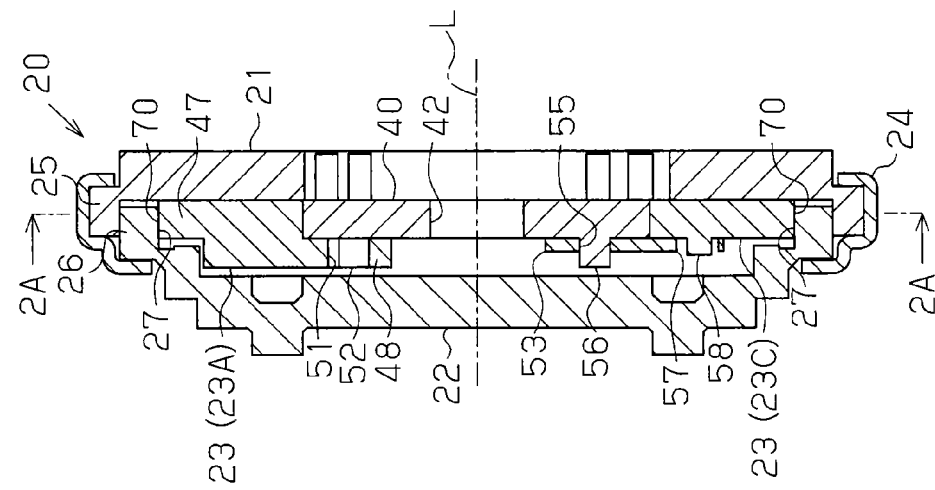
FIG. 2(b) is a cross-sectional view taken along line 2B-2B of FIG. 2(a)
Figure 2A:
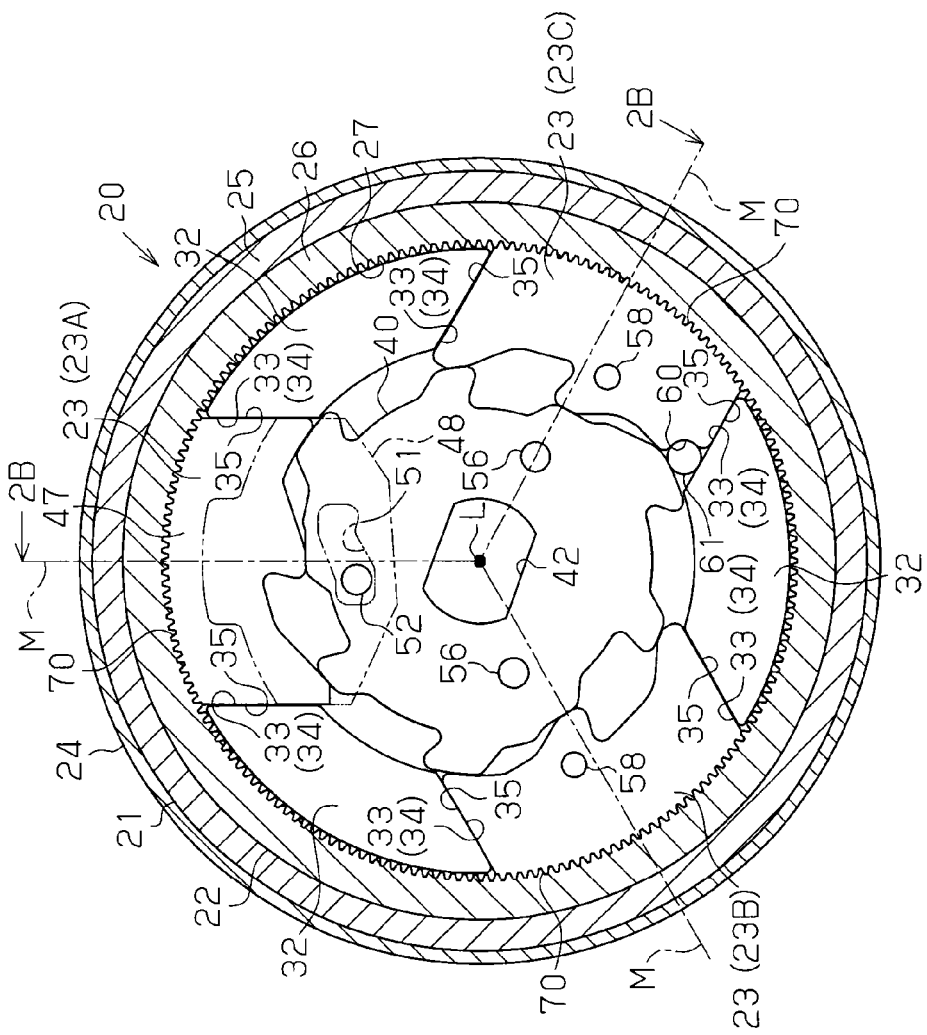
FIG. 2(a) is a cross-sectional view taken along line 2A-2A of FIG. 2(b), illustrating the seat reclining device according to the embodiment of FIG. 1.

More specifically, as shown in FIGS. 2(a), 2(b), and 3, the seat reclining device 20 includes a substantially disk-like lower bracket 21 and also a substantially disk-like upper bracket 22.

The lower bracket 21 and the upper bracket 22 are arranged coaxially to have a common rotation axis L. In the present embodiment, the lower bracket 21, which serves as a second bracket, is secured to the seat cushion 2, and the upper bracket 22, which serves as a first bracket, is secured to the seat back 3. The phrase that the lower bracket 21 is "secured to the seat cushion 2" means that the lower bracket 21 is mounted in a manner that the lower bracket 21 does not move relative to the seat cushion 2, and includes a case where the lower bracket 21 is directly or indirectly secured to the seat cushion 2. Similarly, the phrase that the upper bracket 22 is "secured to the seat back 3" means that the upper bracket 22 is mounted in a manner that the upper bracket 22 does not move relative to the seat back 3, and includes a case where the upper bracket 22 is directly or indirectly secured to the seat back 3. Pawls 23 are arranged between the lower bracket 21 and the upper bracket 22. The pawls 23 are capable of restricting relative rotation between the lower bracket 21 and the upper bracket 22 by engaging with both the lower bracket 21 and the upper bracket 22.

The seat reclining device 20 includes an annular holder 24. The holder 24 is fitted to the outer circumference of the lower bracket 21 and the upper bracket 22. This permits relative rotation of the brackets 21, 22 about the rotation axis L, and restricts relative movement of the brackets 21, 22 along the rotation axis L.

An annular circumferential wall 25, which projects toward the upper bracket 22, is formed on the periphery of the lower bracket 21. An annular circumferential wall 26, which projects toward the lower bracket 21, is formed on the periphery of the upper bracket 22.

The outer diameter of the circumferential wall 26 of the upper bracket 22 is substantially the same as the inner diameter of the circumferential wall 25 of the lower bracket 21. Internal teeth 27 are formed on the entire inner circumferential surface of the circumferential wall 26 of the upper bracket 22. The lower bracket 21 and the upper bracket 22 are arranged to be relatively rotational in a state where the circumferential walls 25, 26 fit each other.

Three retaining projections 32, which are arranged at substantially equal intervals in the circumferential direction, are formed on a surface of the lower bracket 21 that faces the upper bracket 22 in the axial direction. The retaining projections 32 are formed in a substantially sectoral shape, and are designed such that side walls 33 of the adjacent retaining projections 32 that circumferentially face each other are substantially parallel with each other. The pawls 23, the number of which is three in the present embodiment, are retained by the lower bracket 21 to be immovable in the circumferential direction, and movable in the radial direction in a manner that each pawl 23 is sandwiched by a pair of the side walls 33 that circumferentially face each other. The side walls 33 function as guide portions 34, which guide movement of the pawls 23.

Each pawl 23 is formed into a plate. Each pawl 23 is capable of moving in the radial direction in a state where side surfaces 35 of the pawl 23 slide against the side walls 33 of the associated retaining projections 32.

The pawls 23 each have a tip end portion (radially outer portion) that radially faces the circumferential wall 26 of the upper bracket 22 in a state where the pawls 23 are retained by the lower bracket 21. The tip end portion has an arcuate shape corresponding to the circumferential wall 26, and has external teeth 70 capable of meshing with the internal teeth 27 formed on the circumferential wall 26.

A cam body 40, which contacts the basal ends of the pawls 23, is provided radially inward of the pawls 23. The seat reclining device 20 includes a cam mechanism, which rotates the cam body 40 to move the pawls 23 in the radial direction so that the external teeth 70 of the pawls 23 engage with and disengage from the internal teeth 27 of the upper bracket 22.

When the pawls 23 retained by the lower bracket 21 move radially outward in response to the operation of the cam mechanism, and the external teeth 70 mesh with the internal teeth 27 of the upper bracket 22, relative rotation between the brackets 21, 22, that is, tilting of the seat back 3 is restricted.

Furthermore, when the pawls 23 move radially inward based on the operation of the cam mechanism, the external teeth 70 disengage from the internal teeth 27 of the upper bracket 22. As a result, relative rotation between the brackets 21, 22 is permitted, and the tilt angle of the seat back 3 can be adjusted.

Figure 4:
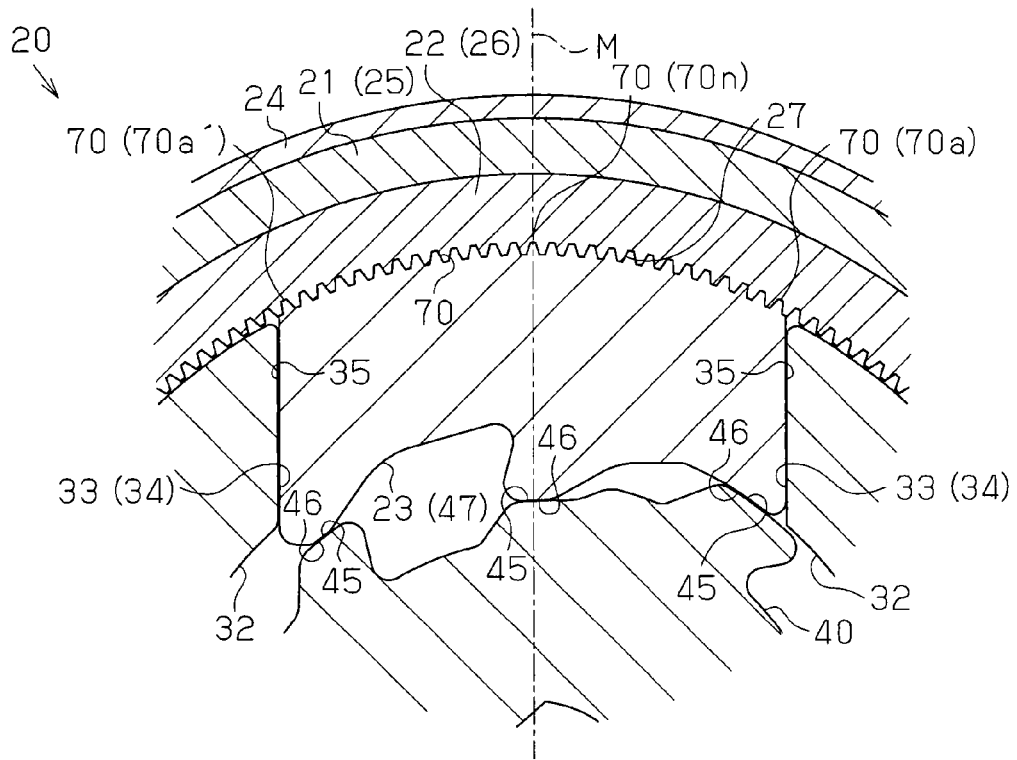
FIG. 4 is a cross-sectional view illustrating the seat reclining device of FIG. 2(a), with one of the pawls and the vicinity thereof being enlarged.

The cam mechanism will now be described in detail. The cam body 40 is formed into a plate. An elongated hole 42, which has a pair of parallel inner side surfaces and extends through the thickness of the cam body 40, is formed at the center of the cam body 40. A non-illustrated manipulation lever is fitted to the elongated hole 42. When the manipulation lever is manipulated, the cam body 40 rotates independently from the lower bracket 21 and the upper bracket As shown in FIG. 4, cam faces 45, the number of which is three in the present embodiment, are formed on the outer circumference of the cam body 40 to correspond to each of the pawls 23. The pawls 23 each have a basal end portion (radially inner portion) that radially faces the cam body 40 in a state where the pawls 23 are retained by the lower bracket 21. Contact portions 46 (the number of which is three), which respectively contact the cam faces 45, are formed on each basal end portion. The shapes of the three cam faces 45 are designed such that contact points between the cam faces 45 and the corresponding contact portions 46 move in the radial direction as the cam body 40 rotates.

More specifically, the contact points between the cam faces 45 and the corresponding contact portions 46 move radially outward (upward in FIG. 4) as the cam body 40 relatively rotates in a locking direction (counterclockwise direction in FIG. 4). The pawls 23, as a result, are moved radially outward (pushed out), and the external teeth 70 mesh with the internal teeth 27 of the upper bracket 22.

As shown in FIGS. 2(a), 2(b) and 3, one of the pawls 23, that is, a first pawl 23A includes a main body 47, which has the external teeth 70 and the contact portions 46, and a plate-like overhang 48, which forms a step with the main body 47.

Figure 5:
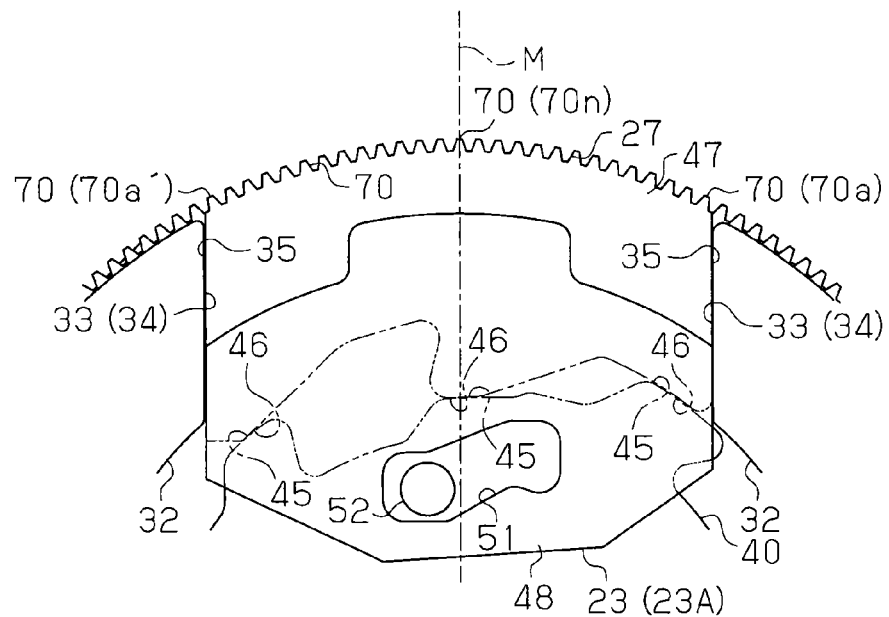
FIG. 5 is an explanatory diagram showing operation of the cam mechanism in the seat reclining device of FIG. 2(a)

As shown in FIGS. 2(b) and 5, the overhang 48 extends between the cam body 40 and the upper bracket 22 to cover part of the periphery of the cam body 40. The overhang 48 has a cam groove 51, which extends through the thickness of the overhang 48. The cam body 40 has an engaging protrusion 52, which protrudes toward the overhang 48 and engages with the cam groove 51.

As shown in FIGS. 2(a), 2(b), 3, and 6, the seat reclining device 20 includes a release plate 53, which is arranged between the cam body 40 and the upper bracket 22 together with the overhang 48 of the first pawl 23A. The release plate 53 is formed into a substantially disk-like shape having a notch 53a. The release plate 53 is arranged between the cam body 40 and the upper bracket 22 in a state in which the overhang 48 of the first pawl 23A is arranged in the notch 53a. In a manner where the release plate 53 covers the basal end portions (radially inner portions) of the remaining two pawls 23, that is, the second and third pawls 23B, 23C, the release plate 53 is arranged to be parallel with the second and third pawls 23B, 23C.

The release plate 53 has fitting holes 55 (the number of which is two in the present embodiment), and the cam body 40 has fitting projections 56, which fit in the fitting holes 55. Fitting of the fitting projections 56 in the fitting holes 55 allows the release plate 53 to rotate integrally with the cam body 40.

The circumferential width of the notch 53a of the release plate 53 is greater than the circumferential width of the overhang 48 of the first pawl 23A. A gap is thus formed between the overhang 48 and the release plate 53 in the circumferential direction. This allows the release plate 53 to be rotated integrally with the cam body 40 without interfering with the overhang 48.

The release plate 53 has cam grooves 57, which extend through the thickness of the release plate 53 at positions corresponding to the second and third pawls 23B, 23C. The second and third pawls 23B, 23C each have an engaging protrusion 58, which protrudes toward the release plate 53 and engages with the corresponding one of the cam grooves 57.

Figure 6:
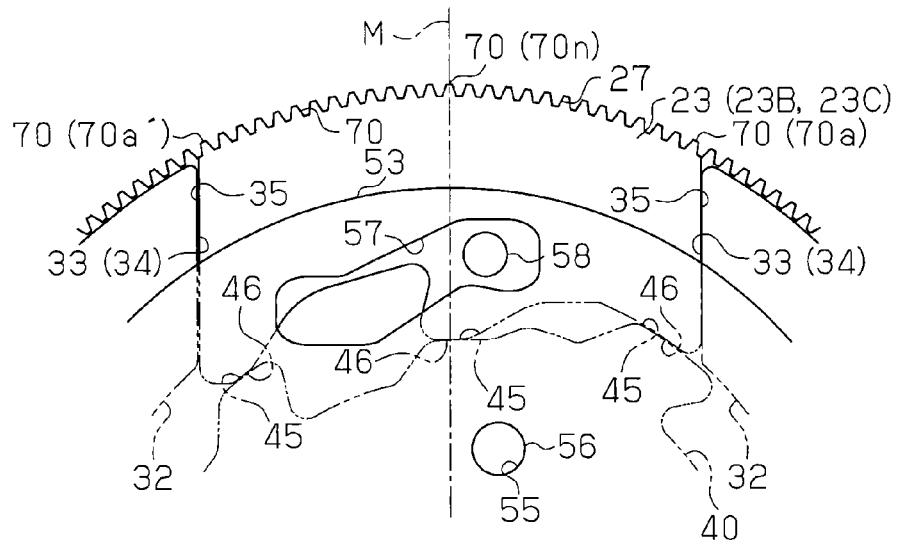
FIG. 6 is an explanatory diagram showing operation of the cam mechanism.

As shown in FIG. 6, each engaging protrusion 58 is formed in the vicinity of a center line M that divides the associated one of the pawls 23B, 23C into two in the circumferential direction. Similarly, as shown in FIG. 5, the engaging protrusion 52 provided on the cam body 40 is also formed in the vicinity of a center line M that divides the first pawl 23A into two in the circumferential direction. As shown in FIGS. 5 and 6, the cam grooves 51, 57, which engage with the engaging protrusions 52, 58, are formed into an elongated hole that is diagonal with respect to the center line M of the corresponding one of the pawls 23.

As each of the engaging protrusions 52, 58 apparently moves in the corresponding one of the cam grooves 51, 57, each pawl 23 is permitted to move radially along the associated guide portions 34. As the cam body 40 (and the release plate 53) rotates in an unlocking direction (clockwise in FIG. 6), the positional relationship between each of the cam grooves 51, 57 and the corresponding one of the engaging protrusions 52, 58 is changed, and the pawls 23 are accordingly moved radially inward (retracted).

As shown in FIG. 3, a spiral spring 59 is located between the cam body 40 and the lower bracket 21. The spiral spring 59 exerts elastic force that urges the cam body 40 in the locking direction (counterclockwise direction in FIG. 5).

When the manipulation lever (not shown) of the seat reclining device 20 is not manipulated, the pawls 23 are in a state of having been moved radially outward. In this state, the pawls 23 are arranged at the locked position where the external teeth 70 mesh with the internal teeth 27 of the upper bracket 22, and the seat reclining device 20 is in a state that restricts relative rotation of the brackets 21, 22, that is, a locked state that restricts tilting of the seat back 3.

When the manipulation lever is manipulated, and the cam body 40 is rotated in the unlocking direction (clockwise direction in FIG. 6) against the elastic force of the spiral spring 59, the pawls 23 move radially inward. The pawls 23, as a result, are arranged at an unlocked position where the external teeth 70 are disengaged from the internal teeth 27 of the upper bracket 22. This brings the seat reclining device 20 into a state that permits relative rotation of the brackets 21, 22, that is, an unlocked state that permits the tilt angle of the seat back 3 to be changed.

As shown in FIGS. 2(a) and 3, a cam face 60 is formed on one of the side surfaces 35 of a third pawl 23C. A ball-like cam body 61 is arranged between the cam face 60 and the side wall 33 of the retaining projection 32 that faces the cam face 60. The cam face 60 and the cam body 61 serve as a wedge that fills a gap in the circumferential direction formed between the associated guide portion 34 and the side surface 35 of the pawl 23, thus reducing rattling of the seat back 3 in the locked state.

Figure 7:
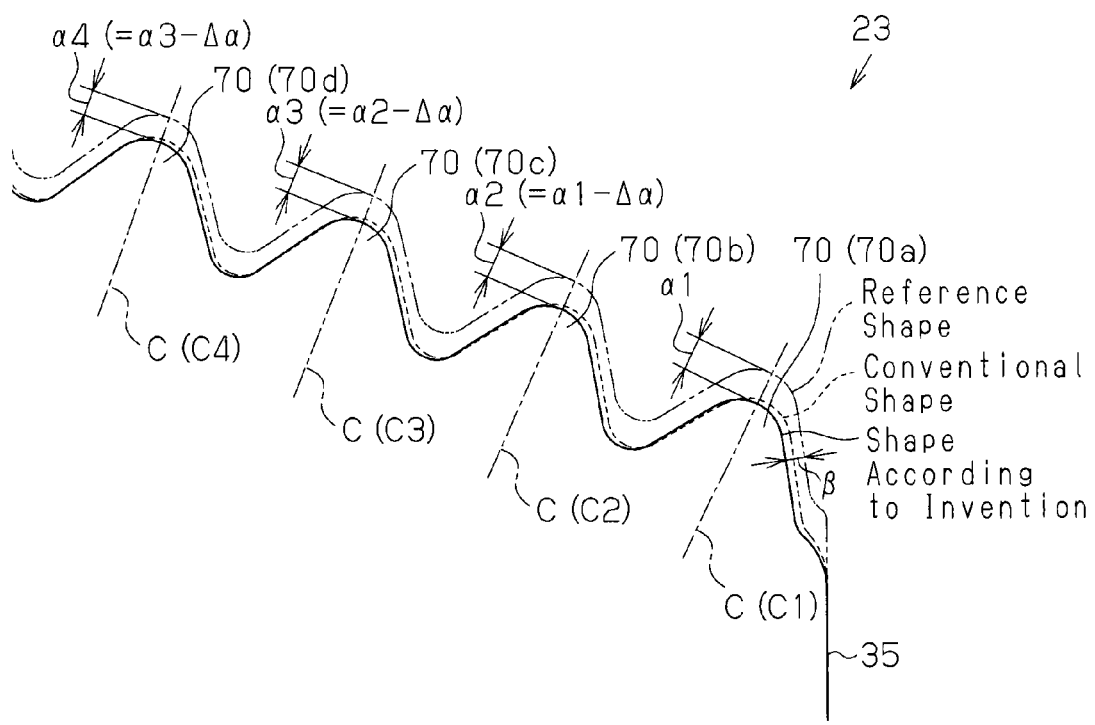
FIG. 7 is an explanatory diagram showing the shape of the external teeth of each pawl.

The shape of the external teeth 70 of the pawls 23 according to the present embodiment will now be described. In FIG. 7, which will be referred to in the following description, the solid line represents the shape of the external teeth 70 (shape according to the invention) of the pawls 23 according to the present embodiment, and the broken line represents conventional external teeth disclosed in Patent Document 1 (conventional shape). The broken line in which a long dash alternates with a pair of short dashes represents a reference shape on the assumption that the external teeth 70 has a single pitch circle corresponding to the pitch circle of the internal teeth 27.

As shown in FIG. 7, in the present embodiment, among the external teeth 70 of each pawl 23, two external teeth 70 closest to the side surfaces 35, that is, the external teeth 70 including the end teeth 70a located on the circumferential ends of the pawl 23 are displaced (offset) radially inward from a reference position (position of the reference shape shown by the broken line in which a long dash alternates with a pair of short dashes in FIG. 7) corresponding to the pitch circle of the internal teeth 27.

More specifically, in the present embodiment, among the external teeth 70 of each pawl 23, all the external teeth 70 except a center tooth located at the circumferential center of the pawl 23 (referring to FIGS. 4 to 6, an external tooth 70n located on the center line M) are displaced radially inward from the reference position. In other words, the external teeth 70 are displaced radially inward with respect to the center tooth 70n.

Concretely, the external teeth 70 (70a to 70d) are displaced radially inward with respect to the reference position along center lines C (C1 to C4) each of which divides the associated external tooth 70 into two in the circumferential direction without changing the shape of effective mesh portions relative to the internal teeth 27 and the pitch circle radius (r) of each of the external teeth 70.

The term "effective mesh portions" of the external teeth 70 refers to parts that contact the internal teeth 27 when in mesh with the internal teeth 27. The shape of the external teeth 70 is designed so as to be identical to the shape of the external teeth of the reference shape shown by the broken line in which a long dash alternates with a pair of short dashes in FIG. 7 except the bottoms that serve as connecting portions between the adjacent external teeth 70.

Figure 8:
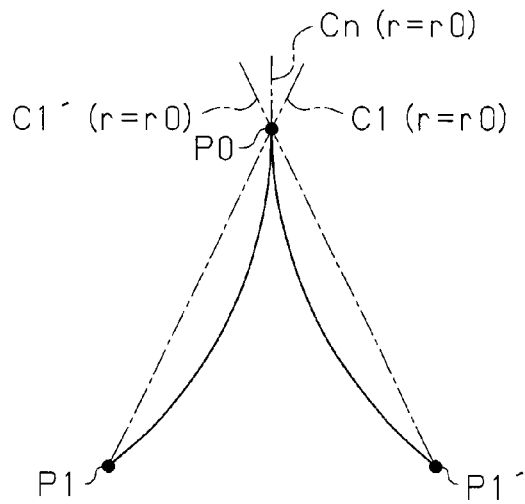
FIG. 8 is an explanatory diagram showing the pitch circle centers of the external teeth.

In FIG. 7, in the conventional external teeth shown by the broken line, the tooth tips of the external teeth that are retracted radially inward than the reference position tilt toward the circumferential end of the pawl (side surface 35). In contrast, in the present embodiment, the center lines C (C1 to C4) of the external teeth 70 displaced from the reference position match with center lines of the external teeth of the reference shape. That is, "displacement (offset)" in the present embodiment means to move the target external teeth 70 in parallel from the reference position along the corresponding center lines C. As shown in FIG. 8, all the center lines C (C1 to C4) of the external teeth 70 displaced from the reference position thus pass through the pitch circle center P0 of the reference shape.

In FIG. 8, radially inner end point of a center line Cn of the center tooth 70n, that is, the pitch circle center of the center tooth 70n matches with the pitch circle center P0 of the reference shape. Points P1, P1' in FIG. 7 show the pitch circle centers of the end teeth 70a, 70a' (see FIGS. 4 to 6). The pitch circle radius r of each of the external teeth 70 (including the center tooth 70n) takes the same value r0. The pitch circle centers of the external teeth 70 arranged between the center tooth 70n and the end teeth 70a, 70a' are located on the solid line that extends, in an arcuate form, between the pitch circle center P0 of the center tooth 70n and the pitch circle centers P1, P1' of the end teeth 70a, 70a' in FIG. 8.

As shown in FIG. 7, the external teeth 70 are configured such that the closer to the circumferential ends of each pawl 23, the greater the displacement from the reference position becomes. That is, the greatest displacement amount $\alpha 1$ is set for the two end teeth 70a, 70a' closest to the side surfaces 35 of each pawl 23, and the closer the external teeth 70 are to the center tooth 70n, the less the displacement amount is set. The displacement amount of the center tooth 70n is zero.

The displacement amount of each of the external teeth 70 is set such that the amount of change La in the displacement will be even. In the present embodiment, the displacement amount $\alpha 1$ of the end tooth 70a (70a') is first determined in designing the external teeth 70. The displacement change amount $\Delta\alpha$ of the other external teeth 70 is determined by equally dividing the displacement amount $\alpha 1$ set for the end tooth 70a (70a') by the number of the external teeth 70 located between and including the end tooth 70a (70a') and the center tooth 70n.

That is, the displacement amount $\alpha 2$ set for the second external tooth 70b from the circumferential end takes a value obtained by subtracting a predetermined change amount $\Delta\alpha$ from the displacement amount $\alpha 1$ of the end tooth 70a ($\alpha 2 = \alpha 1 - \Delta\alpha$). The displacement amount $\alpha 3$ set for the third external tooth 70c takes a value obtained by subtracting a predetermined change amount $\Delta\alpha$ from the displacement amount $\alpha 2$ set for the second external tooth 70b ($\alpha 3 = \alpha 2 - \Delta\alpha$). The displacement amount $\alpha 4$ set for the fourth external tooth 70d takes a value obtained by subtracting the predetermined change amount $\Delta\alpha$ from the displacement amount $\alpha 3$ set for the third external tooth 70c ($\alpha 4 = \alpha 3 - \Delta\alpha$).

Operation of the seat reclining device of the present embodiment will now be described.

The external teeth 70 of each pawl 23 are displaced radially inward with respect to the reference position that corresponds to the pitch circle of the internal teeth 27. A gap is thus formed between the external teeth 70 and the internal teeth 27 without changing the size of the external teeth 70. Due to this, unlike the conventional example (see Patent Document 2), in which a draft angle is added to the pressure angle, the size of the external teeth is prevented from being reduced due to changing the shape of the external teeth. The ease of separation of the external teeth 70 from the internal teeth 27 when moving the pawls 23 radially inward is thus improved without reducing the meshing strength.

In the present embodiment, all the external teeth 70 except the center tooth 70n located at the circumferential center of each pawl 23 are displaced radially inward with respect to the reference position. Thus, in a neutral locked state, as called herein, in which load of an occupant is not applied to the seat back 3, the center tooth 70n and some of the external teeth 70 in the vicinity of the center tooth 70n mainly mesh with the internal teeth 27. When load is applied to the seat back 3, a great meshing strength (locking strength) is required. When load is applied to the seat back 3, however, more external teeth 70 mesh with the internal teeth 27 as the upper bracket 22 slightly rotates by tilting of the seat back 3 that has received the load. This ensures the required locking strength.

In particular, as compared to the conventional example disclosed in Patent Document 1, the present embodiment is advantageous in that a greater clearance β is set on the side of each of the external teeth 70 and on the side closer to the circumferential end of each pawl 23 as shown in FIG. 7.

That is, with the structure in which the pawls 23 are radially moved in response to rotation of the cam body 40, each pawl 23 tilt due to the clearance set between the associated guide portion 34 and the pawl 23. The external teeth 70 are thus brought into a state as if the external teeth 70 are caught on the internal teeth 27 when the external teeth 70 of each pawl 23 located at the locked position disengage from the internal teeth 27 of the upper bracket 22.

Thus, before the external teeth 70 are caught on the internal teeth 27, the greater the clearance β, which exists on the side of the external teeth 70, the greater the radially inward movement of each pawl 23 becomes.

Figure 9:
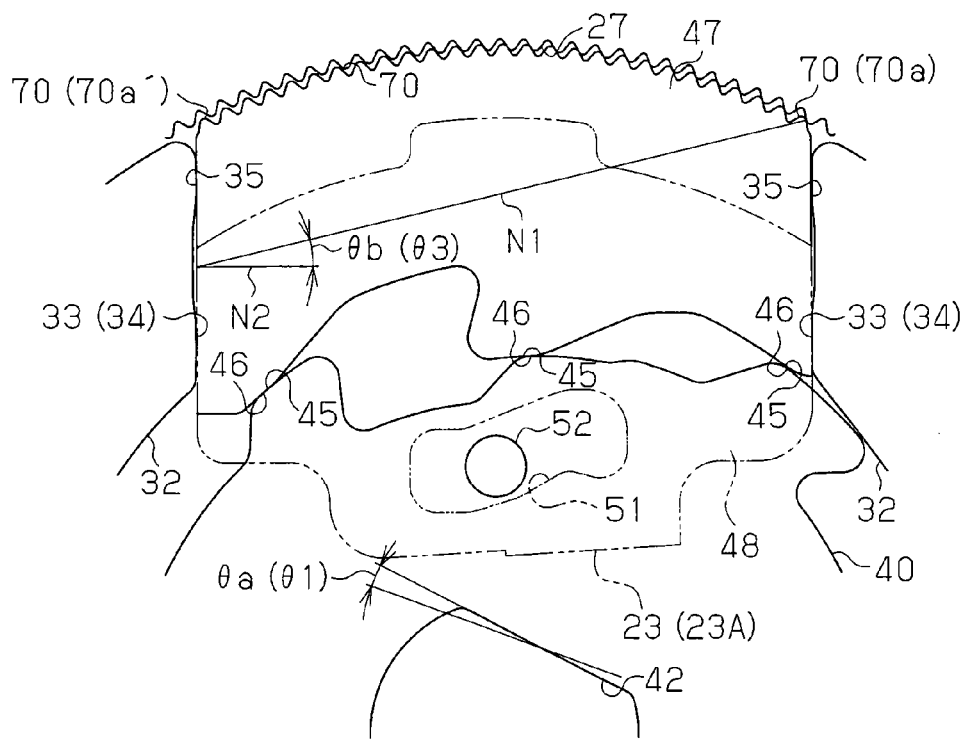
FIG. 9 is an explanatory diagram showing operation of the configuration of one embodiment.
Figure 10:
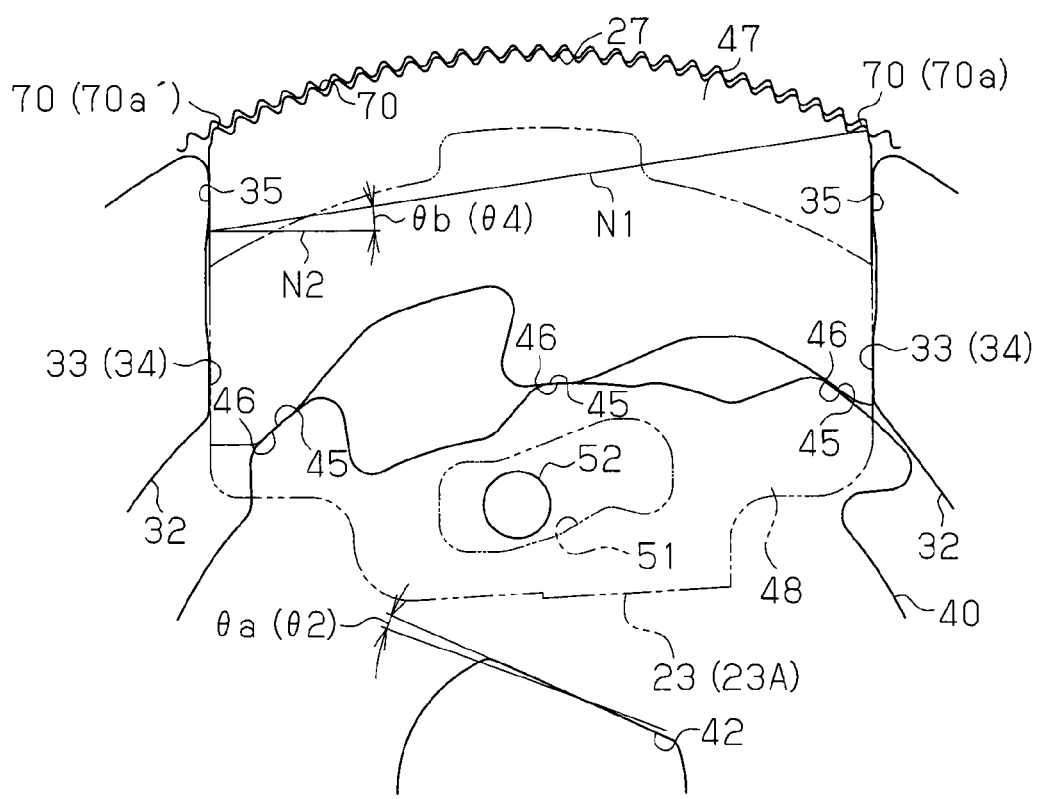
FIG. 10 is an explanatory diagram showing operation of the conventional configuration.

More specifically, in a case where the locking strength in the structure of the present embodiment shown in FIG. 9 is substantially equal to the locking strength of the conventional structure shown in FIG. 10, for example, in regard to an angle θa at which the cam body 40 can be rotated during the period from when the pawls 23 are in the locked position to when the end tooth 70a is caught on the associated internal tooth 27, it has been found out that the value θ1 of the structure of the present embodiment is substantially twice the value θ2 of the conventional structure. Thus, the ease of separation of the external teeth 70 from the internal teeth 27 is further improved in the present embodiment.

With the structure of the present embodiment, the direction of mesh reaction force that acts between the external teeth 70 and the internal teeth 27 in the state in which the external teeth 70 mesh with the internal teeth 27, that is, a common normal line N1 of tooth surfaces of each of the external teeth 70 and the associated one of the internal teeth 27 intersects, at a smaller angle, with the side wall 33 of the retaining projection 32 located circumferentially opposite with respect to the center line M of each pawl 23.

That is, when the pawls 23 move radially inward, each of the pawls 23 is pressed against the associated side wall 33, which functions as the guide portion 34 by the mesh reaction force between the external teeth 70 (mainly the end tooth 70a) and the internal teeth 27. Thus, the greater the angle θb defined by the direction of pressing force (direction of the common normal line N1) and the normal line N2 of the side wall 33, the more smoothly the pawls 23 move radially inward.

In a case where the angle θb in relation to the end tooth 70a is compared, it has been found out that the value θ3 of the structure of the present embodiment shown in FIG. 9 is approximately 1.5 times the value θ4 of the conventional structure shown in FIG. 10. Thus, the present embodiment further improves the ease of separation of the external teeth 70 from the internal teeth 27.

The present embodiment has the following advantages.

(1) The external teeth 70 of each pawl 23 are displaced radially inward with respect to the reference position corresponding to the pitch circle of the internal teeth 27 along the center line of the external teeth 70 without changing the shape of the effective mesh portions relative to the internal teeth 27 and the pitch circle radius of each of the external teeth 70.

With this configuration, a gap is formed between the external teeth 70 and the internal teeth 27 without changing the size of the external teeth 70. In particular, a greater clearance β is formed on the side of the external teeth 70, that is, on the side closer to the circumferential end of each pawl 23. The pawls 23 are thus further moved radially inward before the external teeth 70 are caught on the internal teeth 27. In a state where the external teeth 70 mesh with the internal teeth 27, the direction of the mesh reaction force that acts between each external tooth 70 and the associated internal tooth 27, that is, the common normal line N1 of the tooth surfaces of the external tooth 70 and the internal tooth 27 intersects, at a smaller angle, with the guide portion 34 (side wall 33) located circumferentially opposite with respect to the center line M of the pawl 23. This reduces the component of the force that presses each pawl 23 against the associated side wall 33. As a result, the ease of separation of the external teeth 70 from the internal teeth 27 when moving the pawls 23 radially inward is improved without reducing the meshing strength. Thus, unlocking is smoothly performed while ensuring the required locking strength.

(2) When the external teeth 70 disengage from the internal teeth 27, the closer the external teeth 70 are to the circumferential end of each pawl 23, the easier the external teeth 70 will be caught on the internal teeth 27. The common normal line N1, which represents the direction of the mesh reaction force that acts between the teeth 27, 70, also tends to intersect with the side wall 33, which serves as the guide portion 34, at a greater angle. In this aspect, in the present embodiment, the closer the external teeth 70 are to the circumferential end of each pawl 23, the more the external teeth 70 are displaced radially inward with respect to the reference position. Thus, the ease of separation of the external teeth 70 from the internal teeth 27 is more effectively improved.

(3) The displacement amount of the external teeth 70 is set such that the displacement change amount Δα will be even. With this configuration, meshing load with the internal teeth 27 is efficiently spread over the external teeth 70. As a result, the ease of separation of the external teeth 70 from the internal teeth 27 is more effectively improved. In a case where load is applied to the seat back 3 also, greater locking strength is ensured.

(4) The displacement amount a1 is set for the two end teeth 70a, 70a' closest to the side surfaces 35 of each pawl 23. That is, since two end teeth 70a, 70a' located on the circumferential ends with the center line M of each pawl 23 located in between are displaced radially inward, each pawl 23 is smoothly moved radially inward for unlocking even if the direction of load applied to the seat back 3 is in any direction.

The above described embodiment may be modified as follows.

In the above described embodiment, the first bracket including the internal teeth 27, which is the upper bracket 22 in this embodiment, is secured to the seat back 3, and the second bracket retaining the pawls 23, which is the lower bracket 21 in this embodiment, is secured to the seat cushion 2. However, the configuration is not limited to this, but the first bracket may be secured to the seat cushion 2, and the second bracket may be secured to the seat back 3.

In the above described embodiment, the cam body 40, the manipulation lever (not shown), the overhang 48 of the first pawl 23A, the release plate 53, and the spiral spring 59 configure the cam mechanism. However, the configuration of the cam mechanism is not limited to this, but may be modified as required.

In the above described embodiment, among the external teeth 70 of each pawl 23, all the external teeth 70 except the center tooth 70n located at the center portion of the pawl 23 are displaced radially inward with respect to the reference position. However, the configuration is not limited to this, but any configuration may be employed as long as at least one external tooth 70 including the end tooth 70a (70a') located on one circumferential end of each pawl 23 among the external teeth 70 of the pawl 23 is displaced radially inward with respect to the reference position. That is, for example, the end tooth 70*a* and one or more external teeth 70 continuous with the end tooth 70*a* may be displaced radially inward. Furthermore, the external teeth 70 may be divided into two at the center line M of each pawl 23, and only the external teeth 70 located closer to one of the end teeth 70*a*, 70*a*' may be displaced radially inward with respect to the center line M. Furthermore, only one external tooth 70 other than the center tooth 70*n* may be set as a reference tooth that is not displaced radially inward. Alternatively, only two end teeth 70*a*, 70*a*', or only one of the two end teeth 70*a*, 70*a*' may be displaced radially inward.

In the above described embodiment, the closer the external teeth 70 are to the circumferential end of each pawl 23, the greater the external teeth 70 are displaced radially inward with respect to the reference position. The radially inward displacement change amount $\Delta\alpha$ is set to be even. However, the configuration is not limited to this, but for example, the displacement change amount $\Delta\alpha$ may be uneven, for example, a certain number of the continuous external teeth 70 may have the same displacement amount. Also, the external teeth 70 that are not displaced radially inward may exist between the external teeth 70 that are displaced radially inward.

In the above described embodiment, the seat reclining device 20 includes three pawls 23 (23A to 23C), but the number of the pawls may be changed as required.

Then invention claimed is:

1. A vehicle seat reclining device, comprising:
    a first bracket adapted to be secured to one of a seat cushion and a seat back, wherein the first bracket includes an annular inner circumferential surface and internal teeth provided on the inner circumferential surface;
    a plurality of pawls each including external teeth that are engageable with and disengageable from the internal teeth;
    a second bracket adapted to be secured to the other of the seat cushion and the seat back, wherein the second bracket includes a guide portion that holds the pawls such that the pawls are movable in a radial direction, and the second bracket is capable of adjusting a tilt angle of the seat back relative to the seat cushion according to relative rotation of the second bracket with respect to the first bracket; and
    a cam mechanism including a cam body arranged radially inward of the pawls, wherein the cam mechanism moves the pawls in the radial direction according to rotation of the cam body to engage and disengage the external teeth of the pawls with and from the internal teeth of the first bracket,
    wherein among the external teeth of each of the pawls, at least one external tooth including an end tooth located at one circumferential end of the pawl is displaced radially inward with respect to a reference position corresponding to a pitch circle of the internal teeth to move in parallel along a center line that divides the external tooth into two in the circumferential direction without changing the shape of an effective mesh portion with respect to the internal teeth and a pitch circle radius of the external teeth.

2. The vehicle seat reclining device according to claim 1, wherein
    in each of the pawls, a plurality of continuous external teeth including the end tooth is displaced radially inward, and
    the continuous external teeth of each pawl are configured such that the closer to one circumferential end of the pawl, the more displaced radially inward with respect to the reference position.

3. The vehicle seat reclining device according to claim 2, wherein an amount of change in the radially inward displacement is even.

4. The vehicle seat reclining device according to claim 1, wherein at least end teeth located at circumferential ends of each pawl are displaced radially inward with respect to the reference position.

5. The vehicle seat reclining device according to claim 1, wherein at least one external tooth including the end tooth is displaced radially inward with respect to the external tooth located at a circumferential center of each pawl.

* * * * *